United States Patent Office.

EPHRAIM B. WELLS, OF NEW YORK, N. Y.

Letters Patent No. 76,012, dated March 24, 1868.

IMPROVED ROOFING-COMPOUND.

*The Schedule referred to in these Letters Patent and making part of the same.*

TO ALL WHOM IT MAY CONCERN:

Be it known that I, EPHRAIM B. WELLS, of New York, in the county of New York, and in the State of New York, have invented certain new and useful Improvements in Roofing-Compounds; and do hereby declare that the following is a full, clear, and exact description thereof.

My invention consists in the mixture of the following ingredients: Coal-tar, fifty (50) parts; burnt clay, five (5) parts; lime, twenty (20) parts; magnesia, fifteen (15) parts; silica, ten (10) parts.

The above-named ingredients, when perfectly mixed, forming a homogeneous mass and of suitable consistency, are designed to be spread with a trowel, or other implement, on all kinds of roofs, boat-decks, or wherever the same may be required, and make a roofing-compound superior to any ever before known or used.

I do not wish to confine myself to any specific proportions of the above-named ingredients, as other proportions may do nearly as well.

The above-described compound becomes very hard in a short time, and is impervious to water, will not wear out fast, is fire-proof, and not liable to crack by heat or cold.

Having thus fully described my invention, what I claim as new, and desire to secure by Letters Patent, is—

The within-described compound, when mixed and used, substantially as and for the purpose specified.

In testimony that I claim the foregoing, I have hereunto set my hand, this 25th day of January, 1868.

E. B. WELLS.

Witnesses:
    C. M. ALEXANDER,
    J. M. MASON.